J. V. BOURKE.
STEERING AUTOMOTORS OR MOTOR VEHICLES.
APPLICATION FILED OCT. 10, 1914.
1,177,986.
Patented Apr. 4, 1916.
2 SHEETS—SHEET 2.
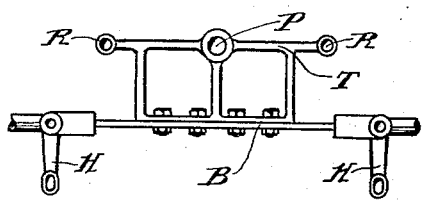
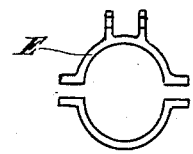
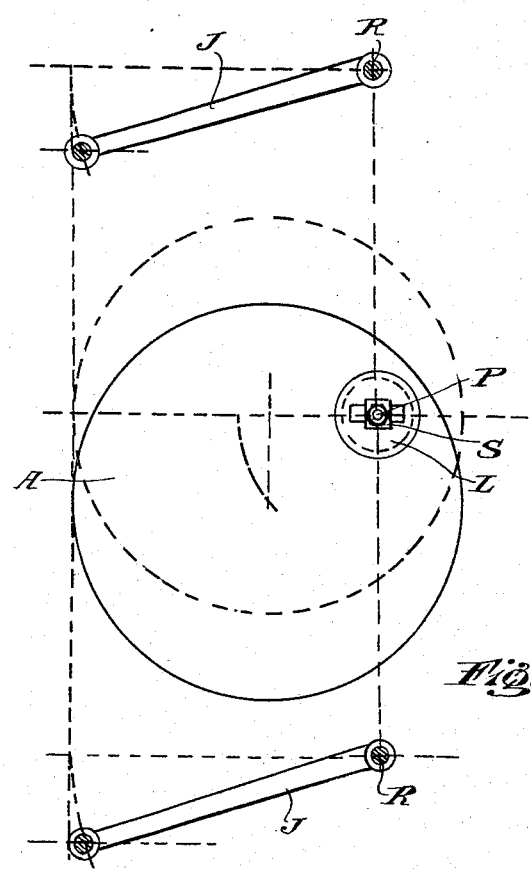
Witnesses:
Geo. D. Riley.
C. A. Krug
Inventor:
John V. Bourke,
by his Attorney

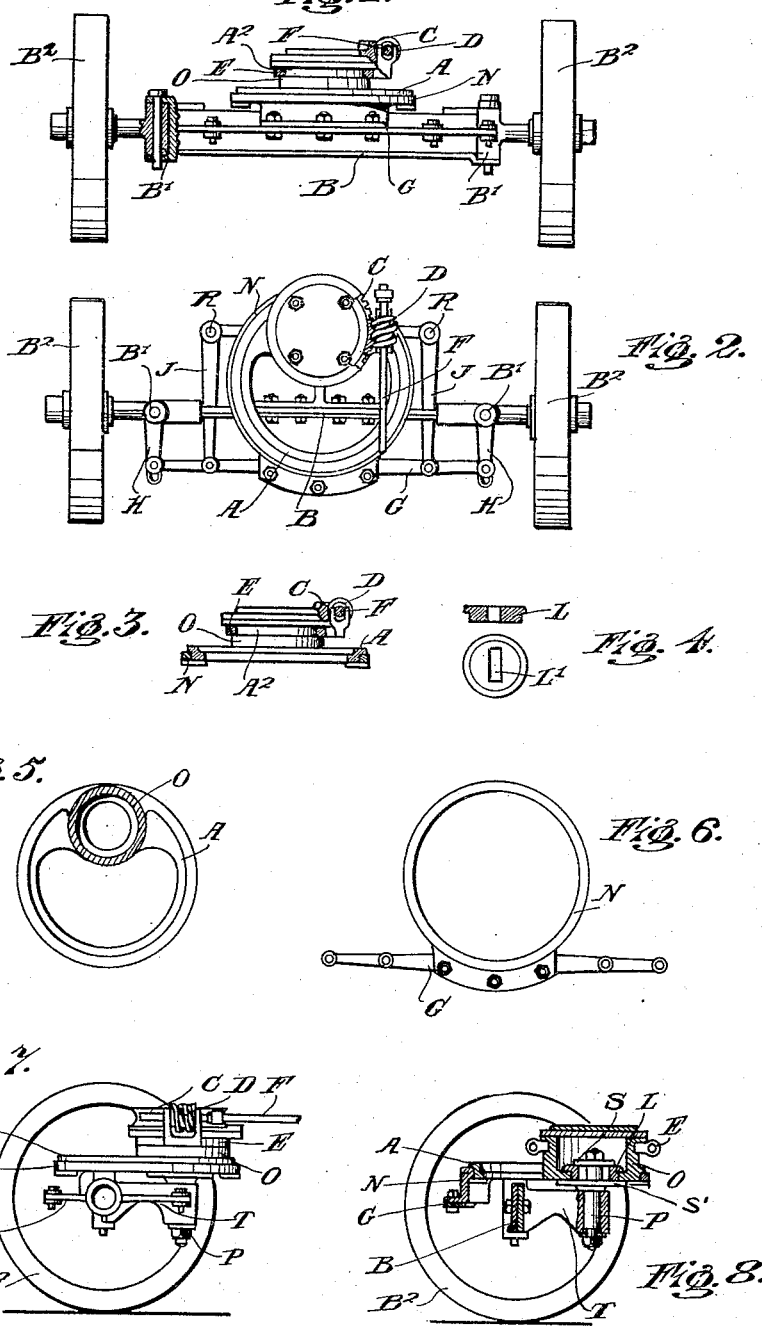

UNITED STATES PATENT OFFICE.

JOHN VINCENT BOURKE, OF SOUTH LAMBETH, LONDON, ENGLAND.

STEERING AUTOMOTORS OR MOTOR-VEHICLES.

1,177,986.  Specification of Letters Patent. Patented Apr. 4, 1916.

Application filed October 10, 1914. Serial No. 866,165.

*To all whom it may concern:*

Be it known that I, JOHN VINCENT BOURKE, a subject of the King of Great Britain, and a resident of 4 Heyford avenue, South Lambeth, London, S. W., England, have invented new and useful Improvements in the Steering of Automotors or Motor-Vehicles, of which the following is the specification.

This invention consists in the application of means and mechanism to the steering apparatus of automotors or motor vehicles whereby the unequal forces sometimes encountered by the leading wheels, tending to cause swerving or skidding, are borne by the said means or mechanism, thus relieving the worm gear or the like from all strains in steering.

The improved means and mechanism consists of an eccentric and links combined and operating with the ordinary steering apparatus of a motor vehicle.

In order that my invention may be completely understood, reference should be made to the accompanying sheets of drawings which illustrate one example thereof.

Figure 1 is a front elevation of the leading wheels, axle and steering apparatus of a motor vehicle showing my appliances in position. Fig. 2 is a plan of the mechanism showing how it is attached to the axle. Fig. 3 is a vertical section of the eccentric through the center. Fig. 4 shows a slotted disk on which the eccentric rotates. Fig. 5 is a plan of the eccentric partly in section. Fig. 6 shows the eccentric strap connected to the steering link bar. Fig. 7 is a side elevation showing the mechanism with one front wheel removed. Fig. 8 is a vertical section through the eccentric. Fig. 9 is a plan of the supporting bracket which carries the eccentric, and is connected to the main axle. Fig. 10 is a plan of the guide ring. Fig. 11 is a diagrammatic plan showing the difference in versed sine in the curvature of the traverse of the links, and that of the center of the eccentric and illustrating how that difference is compensated for by the slotted disk on which the eccentric is mounted.

A is the eccentric mounted upon the axle B of the car or vehicle in a manner hereinafter described. Pivotally mounted at either end of the axle B are stub axles $B^1$ $B^1$ upon which the wheels $B^2$ $B^2$ are mounted in the usual manner.

The axle B has rigidly secured thereto a frame or bracket T (Fig. 8) which bracket is adapted to carry a stationary pin P formed at its upper end of rectangular section.

The eccentric A has formed therewith a hollow boss or extension O upon which is mounted a worm wheel quadrant or wheel C for rotating same.

The boss O is adapted to oscillate or rotate upon and around a disk L provided with an oblong slot L' (Fig. 4) in which the rectangular portion of the fixed pin P fits. The disk is permitted by the slot to slide upon the pin P, the disk resting upon and slidably engaging the upper face of the portion S' of the bracket, and also slidably engaging the under face of a slide plate S secured on the upper end of the pin, said parts S' and S also serving to prevent vertical movement of the eccentric.

The boss O of the eccentric A is provided with a hollow groove or channel $A^2$ within which a fixed ring or collar E fits, and around which the boss O is adapted to slide or partly rotate. The said ring E carries a worm D adapted to engage the worm wheel C. The said worm is keyed or feathered on the steering shaft F in any approved way to slide longitudinally on the shaft and rotate therewith in such manner that the worm wheel C will be given a partial rotation by the rotation of the steering wheel (not shown) of the car.

Rigidly secured to the strap N of the eccentric A is a bar or link G connected at its end to levers H, H, secured in the usual manner to the stub axles $B^1$, $B^1$; the said levers H, H, are slotted at their ends in order to compensate for the difference in radius between the said levers and the eccentric.

On either side of the center pin P on the frame T and in a straight line parallel to the axle B through the pin P, I provide pins R, R (Fig. 9) upon which pins parallel links J, J, are adapted to oscillate. The links J, J, are pivotally connected at their ends to the steering bar or link G in such manner that the bar or link will have a parallel movement in relation to the main axle B.

Referring to Fig. 11, this shows the difference in the versed sine in the curvature of the traverse of the links J, J, and that of the center of the eccentric and how that difference is compensated for by the slotted disk on which the eccentric is mounted. It will be seen by this diagram that uneven forces from either of the wheels cannot affect the steering, such forces being resisted by the stationary or eccentric pin while the eccentric is capable of being moved freely by the action of the worm and worm wheel. By these means swerving or skidding of the vehicle is prevented.

What I do claim as my invention and desire to secure by Letters Patent is:—

1. In a steering mechanism for motor vehicles, the combination with pivoted axles having steering arms, and a fixed support, of a pivotal rod connection between said arms, a parallel link connection between said fixed support and said pivotal rod connection, an eccentric mounted on the support for lateral oscillation and bodily shifting movement forward and back, an eccentric strap on the eccentric, a rigid connection between said eccentric strap and the said pivotal rod connection, and operating means for turning the eccentric.

2. In a steering mechanism for motor vehicles, the combination with pivoted axles having steering arms, and a fixed support of a pivotal rod connection between said arms, a parallel link connection between said fixed support and said pivotal rod connection, an eccentric mounted on the support for lateral oscillation and bodily shifting movement forward and back, an eccentric strap on the eccentric, a rigid connection between said eccentric strap and the said pivotal rod connection, and operating means for turning the eccentric, said means including a worm cooperating with the said worm wheel.

3. In a steering mechanism for motor vehicles, the combination with pivoted axles having steering arms, and a fixed support of a pivotal rod connection between said arms, a parallel link connection between said fixed support and said pivotal rod connection, an eccentric mounted on the support for lateral oscillation and bodily shifting movement forward and back, an eccentric strap on the eccentric, a rigid connection between said eccentric strap and the said pivotal rod connection, and operating means for turning the eccentric, said means including a worm wheel on the eccentric, a worm cooperating with the said worm wheel, and a rotary shaft connected with the said worm.

4. In a steering mechanism for motor vehicles, the combination with pivoted axles having steering arms, and a fixed support, of a pivotal rod connection between said arms, an eccentric mounted on said support between the pivoted axles for lateral oscillation and bodily shifting movement forward and back, an eccentric strap on the eccentric rigidly connected with said pivotal rod connection, a parallel link connection between said support and the pivotal rod connection at each side of the eccentric, and operating means to turn the eccentric.

5. In a steering mechanism for motor vehicles, the combination with pivoted axles having steering arms, and a fixed support, of a pivotal rod connection between said arms, an eccentric mounted on said support between the pivoted axles for lateral oscillation and bodily shifting movement forward and back, an eccentric strap on the eccentric rigidly connected with said pivotal rod connection, a parallel link connection between said support and the pivotal rod connection at each side of the eccentric, and operating means to turn the eccentric, said means including a worm wheel on the eccentric, a part mounted on the eccentric to permit rotation of the eccentric relative thereto, and a worm carried by said part to coöperate with the said worm wheel.

6. In a steering mechanism for motor vehicles, the combination with pivoted axles having steering arms, and a fixed support, of a pivotal rod connection between said arms, an eccentric mounted on said support between the pivoted axles for lateral oscillation and bodily shifting movement forward and back, an eccentric strap on the eccentric rigidly connected with said pivotal rod connection, a parallel link connection between said support and the pivotal rod connection at each side of the eccentric, and operating means to turn the eccentric, said means including a worm wheel on the eccentric, a ring mounted on the eccentric to permit rotation of the eccentric relative thereto, and a worm carried by said ring to coöperate with the said worm wheel.

7. In a steering mechanism for motor vehicles, the combination with an axle, pivoted stub axles at the ends thereof provided with steering arms, a vertically extending bearing on the axle intermediate its ends, an eccentric mounted on said bearing for lateral oscillation and to shift bodily forwardly and back, an eccentric strap on the eccentric, rod sections rigidly connected with the eccentric strap at its free end, said rod sections extending to opposite sides of the eccentric strap to the respective steering arms and being pivotally connected therewith, parallel link connection between said rod sections and the said vertical bearing at each side thereof, and operating means to turn the eccentric.

8. In a steering mechanism for motor vehicles, the combination with an axle, pivotal stub axles at the ends thereof having steering arms, a bracket on the axle extending to the rear thereof, a vertical bearing on said bracket, a member mounted on said bearing for movement forward and back at right angles to the longitudinal axis of the axle, an eccentric arranged to oscillate about said member as a pivot, an eccentric strap on the eccentric, connections between the steering arms and the eccentric strap and operating means to turn the eccentric.

9. In a steering mechanism for motor vehicles, the combination with an axle, pivoted stub axles at the ends thereof having steering arms, a bracket on the axle extending to the rear thereof, a vertical bearing on said bracket, a member mounted on said bearing for movement forward and back at right angles to the longitudinal axis of the axle, an eccentric mounted to oscillate about said member as a pivot, an eccentric strap on the eccentric, a pivotal rod connection between the steering arms of the stub axles, a rigid connection between said rod and the eccentric strap, parallel link connections between the said rod and the bracket, said parallel link connections being arranged one at each side of said vertical bearing, and operating means to turn the eccentric.

10. In a steering mechanism for motor vehicles, the combination with an axle, pivoted stub axles at the ends thereof having arms, a bracket on the axle, a vertical pin on said bracket, a disk mounted on said bearing for movement forward and back at right angles to the longitudinal axis of the axle, said disk being provided with an elongated slot slidably engaged by the pin, an eccentric arranged to oscillate about the disk as a pivot, an eccentric strap on the eccentric, connections between the steering arms and the eccentric strap, and operating means to turn the eccentric.

11. In a steering mechanism for motor vehicles, the combination with an axle, pivoted stub axles at the ends thereof, having steering arms, a bracket on the axle, a vertical pin on the bracket, said pin having a portion rectangular shaped in cross section, a disk provided with an oblong slot to slidably engage the rectangular shaped portion of the pin to slide thereon, an eccentric arranged to oscillate about said disk as a pivot, an eccentric strap on the eccentric, connections between the steering arms and the eccentric strap, and operating means to turn the eccentric.

12. In a steering mechanism for motor vehicles, the combination with an axle, pivoted stub axles at the ends thereof having steering arms, a bracket on the axle, a vertical pin on the bracket, a disk having an enlongated slot to slidably engage the pin, a slide plate on the bracket for the disk at the under side thereof, a slide plate at the upper end of the pin engaged by the disk, an eccentric arranged to oscillate about said disk as a pivot, an eccentric strap on the eccentric, connections between the steering arms and the eccentric strap, and operating means to turn the eccentric.

JOHN VINCENT BOURKE.

Witnesses:
I. D. ROOTS,
O. J. WORTH.

Copies of this patent may be obtained for five cents each, by addressing the "Commissioner of Patents, Washington, D. C."